US008831360B2

(12) United States Patent
Cok

(10) Patent No.: US 8,831,360 B2
(45) Date of Patent: Sep. 9, 2014

(54) MAKING IMAGE-BASED PRODUCT FROM DIGITAL IMAGE COLLECTION

(75) Inventor: Ronald Steven Cok, Rochester, NY (US)

(73) Assignee: Intellectual Ventures Fund 83 LLC, Las Vegas, NV (US)

(*) Notice: Subject to any disclaimer, the term of this patent is extended or adjusted under 35 U.S.C. 154(b) by 18 days.

(21) Appl. No.: 13/278,287

(22) Filed: Oct. 21, 2011

(65) Prior Publication Data

US 2013/0101231 A1 Apr. 25, 2013

(51) Int. Cl.
*G06K 9/62* (2006.01)
*G06F 17/30* (2006.01)

(52) U.S. Cl.
CPC ...... *G06F 17/30256* (2013.01); *G06F 17/3028* (2013.01)
USPC .......................................... 382/224

(58) Field of Classification Search
CPC ... G06K 15/025; G06K 7/10821; G06K 9/40; G06K 9/6202; G06K 9/78
See application file for complete search history.

(56) References Cited

U.S. PATENT DOCUMENTS

| 6,147,768 | A | 11/2000 | Norris |
| 6,282,317 | B1 | 8/2001 | Luo et al. |
| 6,389,181 | B2 | 5/2002 | Shaffer et al. |
| 6,671,405 | B1 | 12/2003 | Savakis et al. |
| 6,816,847 | B1 | 11/2004 | Toyama |
| 7,035,467 | B2 | 4/2006 | Nicponski |
| 7,366,994 | B2 | 4/2008 | Loui |
| 7,836,093 | B2 | 11/2010 | Gobeyn et al. |
| 2004/0075743 | A1 | 4/2004 | Chatani |
| 2007/0008321 | A1 | 1/2007 | Gallagher et al. |
| 2007/0177805 | A1 | 8/2007 | Gallagher |
| 2007/0239683 | A1 | 10/2007 | Gallagher |
| 2008/0115055 | A1 | 5/2008 | Sadovsky et al. |
| 2008/0212851 | A1 | 9/2008 | Ray |
| 2008/0304808 | A1* | 12/2008 | Newell et al. .................. 386/52 |
| 2008/0306749 | A1 | 12/2008 | Fredlund et al. |
| 2009/0297045 | A1 | 12/2009 | Poetker et al. |
| 2010/0034063 | A1 | 2/2010 | Kondo |

(Continued)

FOREIGN PATENT DOCUMENTS

| WO | 2008079249 | 7/2008 |
| WO | 2008156558 | 12/2008 |

(Continued)

OTHER PUBLICATIONS

Rapid object detection using a boosted cascade of simple features, by P. Viola & M. Jones, in computer Vision and Pattern Recognition, 2001, Proceedings of the 2001 IEEE Computer Society Conference, 2001, pp. I-511-1-518 vol. 1.

(Continued)

*Primary Examiner* — Stephen R Koziol
*Assistant Examiner* — Amandeep Saini

(57) ABSTRACT

A method of making an image-based product includes storing a plurality of digital images; providing one or more image distributions, each image distribution corresponding to a theme and including a distribution of image types related to the theme; selecting a theme having a corresponding image distribution, the image distribution having a distribution of image types; using a computer to select digital images from the plurality of digital images, the selected digital images having the image distribution corresponding to the selected theme; and assembling the selected digital images into an image-based product.

24 Claims, 10 Drawing Sheets

(56) References Cited

U.S. PATENT DOCUMENTS

| | | |
|---|---|---|
| 2010/0156834 A1 | 6/2010 | Sangster |
| 2010/0269037 A1 | 10/2010 | Atkins |
| 2010/0296133 A1 | 11/2010 | Zahnert et al. |
| 2011/0026835 A1 | 2/2011 | Ptucha et al. |
| 2011/0075917 A1 | 3/2011 | Cerosaletti et al. |
| 2011/0123124 A1 | 5/2011 | Peters |
| 2011/0125586 A1 | 5/2011 | Evans |
| 2011/0157226 A1 | 6/2011 | Ptucha et al. |
| 2011/0234613 A1 | 9/2011 | Hanson et al. |
| 2011/0305395 A1 | 12/2011 | Takayama et al. |
| 2012/0027256 A1 | 2/2012 | Kiyohara et al. |
| 2012/0054600 A1 | 3/2012 | Mccurdy et al. |
| 2012/0078961 A1 | 3/2012 | Goenka |
| 2012/0274846 A1 | 11/2012 | Kimura et al. |
| 2013/0050745 A1 | 2/2013 | Cok et al. |

FOREIGN PATENT DOCUMENTS

| | | |
|---|---|---|
| WO | 2008079286 | 6/2009 |
| WO | WO-2010/028169 | 3/2010 |
| WO | WO-2011/065236 | 6/2011 |

OTHER PUBLICATIONS

Feature-centric evaluation for efficient cascaded object detection, H. Schneiderman, in Computer Vision and Pattern Recognition, 2004; Proceedings of the 2004 IEEE Computer Society Conference, 2004,pp. II-29-II-36, vol. 2.

Active Shape Models-Their Training and Application, T. F. Cootes, C. J. Taylor, D. H. Cooper & J. Graham, Computer Vision & Image Understanding, vol. 61,pp. 38-59, 1995.

Facial Pose Estimation Using a Symmetrical Feature Model, by R.W. Ptucha, et al., Proceedings of ICME—Workshop on Media information analysis for personal and social applications, 2009.

Non-Final Office Action on U.S. Appl. No. 13/222,799, mailed Apr. 18, 2014.

Chandramouli et al., "Semantic Structuring and Retrieval of Event Chapters in Social Photo Collections," Proceedings of the International Conference on Multimedia Information Retrieval, MIR '10, Jan. 1, 2010, pp. 507-515.

Final Office Action on U.S. Appl. No. 13/222,605, mailed Oct. 22, 2013.

Final Office Action on U.S. Appl. No. 13/222,650, mailed Oct. 23, 2013.

Final Office Action on U.S. Appl. No. 13/222,699, mailed Nov. 14, 2013.

Final Office Action on U.S. Appl. No. 13/222,799, mailed Sep. 25, 2013.

International Search Report and Written Opinion for PCT/US2013/040341, mailed Jul. 26, 2013.

Non-Final Office Action on U.S. Appl. No. 13/222,605, mailed Feb. 3, 2014.

Non-Final Office Action on U.S. Appl. No. 13/222,650, mailed Feb. 6, 2014.

Non-Final Office Action on U.S. Appl. No. 13/222,650, mailed May 21, 2013.

Non-Final Office Action on U.S. Appl. No. 13/222,699, mailed Jul. 11, 2013.

Non-Final Office Action on U.S. Appl. No. 13/222,699, mailed Jan. 27, 2014.

Non-Final Office Action on U.S. Appl. No. 13/222,799, mailed May 21, 2013.

Non-Final Office Action on U.S. Appl. No. 13/469,135 mailed Dec. 5, 2013.

Non-Final Office Action on U.S. Appl. No. 13/222,605, mailed May 21, 2013.

Final Office Action on U.S. Appl. No. 13/222,650, mailed Jun. 20, 2014.

Final Office Action on U.S. Appl. No. 13/222,605, mailed Jul. 14, 2014.

Final Office Action on U.S. Appl. No. 13/222,699, mailed Jul. 14, 2014.

* cited by examiner

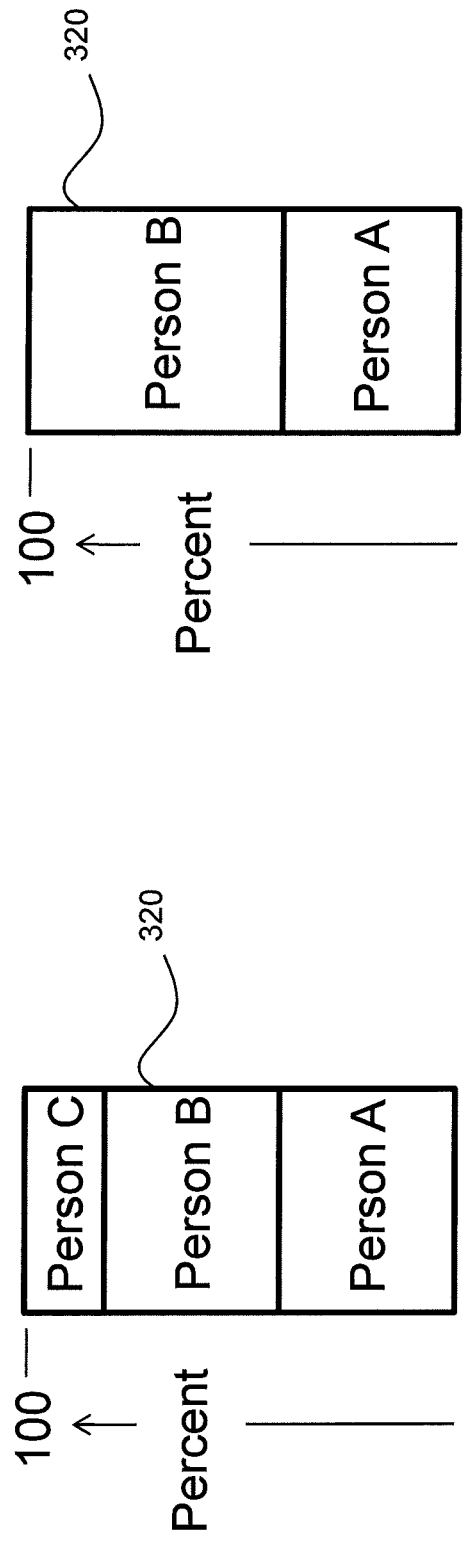

MAKING IMAGE-BASED PRODUCT FROM DIGITAL IMAGE COLLECTION

CROSS REFERENCE TO RELATED APPLICATIONS

Reference is made to commonly-assigned, U.S. patent application Ser. No. 13/222,605, entitled "Automated Photo-Product Specification Method", filed Aug. 31, 2011, by Ronald S. Cok, et al.; Ser. No. 13/222,650, entitled "Automated Photo-Product Specification Method", filed Aug. 31, 2011, by Ronald S. Cok et al.; Ser. No. 13/222,699, entitled "Automated Photo-Product Specification Method", filed Aug. 31, 2011, by Ronald S. Cok, et al.; and Ser. No. 13/222,799, entitled "Automated Photo-Product Specification Method", filed Aug. 31, 2011, by Ronald S. Cok, et al., the disclosures of which are incorporated herein.

FIELD OF THE INVENTION

The present invention relates to photographic products having digital images that include multiple digital images and more specifically to automated methods for selecting digital images from an image collection to be included in an image-based product.

BACKGROUND

Products that include images are a popular keepsake or gift for many people. Such products typically include an image captured by a digital camera that is inserted into the product and is intended to enhance the product, the presentation of the image, or to provide storage for the image. Examples of such products include picture albums, photo-collages, posters, picture calendars, picture mugs, t-shirts and other textile products, picture ornaments, picture mouse pads, and picture post cards. Products such as picture albums, photo-collages, and picture calendars include multiple images. Products that include multiple images are designated herein as image-based products.

When designing or specifying photographic products, it is desirable to select a variety of images that provide interest, aesthetic appeal, and narrative structure. For example, a selection of images having different subjects, taken at different times under different conditions that tell a story can provide interest. In contrast, in a consumer product, a selection of similar images of the same subject taken under similar conditions is unlikely to be as interesting.

In conventional practice, images for a photographic product are selected by a product designer or customer, either manually or with the help of tools. For example, graphic and imaging software tools are available to assist a user in laying out a multi-image product, such as a photo-book. Similarly, on-line tools available over the internet from a remote computer server enable users to specify photographic products. The Kodak Gallery provides such image-product tools. However, in many cases consumers have a large number of images, for example, stored in an electronic album in a computer-controlled electronic storage device using desktop or on-line imaging software tools. The selection of an appropriate variety of images from the large number of images available can be tedious and time consuming.

Imaging tools for automating the specification of photographic products are known in the prior art. For example, tools for automating the layout and ordering of images in a photo-book are available from the Kodak Gallery as are methods for automatically organizing images in a collection into groups of images representative of an event. It is also known to divide groups of images representative of an event into smaller groups representative of sub-events within the context of a larger event. For example, images can be segmented into event groups or sub-event groups based on the times at which the images in a collection were taken. U.S. Pat. No. 7,366,994, incorporated by reference herein in its entirety, describes organizing digital objects according to a histogram timeline in which digital images can be grouped by time of image capture. U.S. Patent Publication No. 2007/0008321, incorporated by reference herein in its entirety, describes identifying images of special events based on time of image capture.

Semantic analyses of digital images are also known in the art. For example, U.S. Pat. No. 7,035,467, incorporated by reference herein in its entirety, describes a method for determining the general semantic theme of a group of images using a confidence measure derived from feature extraction. Scene content similarity between digital images can also be used to indicate digital image membership in a group of digital images representative of an event. For example, images having similar color histograms can belong to the same event.

U.S. Patent Publication No. 2008/0304808, incorporated by reference herein in its entirety, describes a method and system for automatically producing an image product based on media assets stored in a database. A number of stored digital media files are analyzed to determine their semantic relationship to an event and are classified according to requirements and semantic rules for generating an image product. Rule sets are applied to assets for finding one or more assets that can be included in a story product. The assets, which meet the requirements and rules of the image product are included.

U.S. Pat. No. 7,836,093, incorporated by reference herein in its entirety, describes systems and methods for generating user profiles based at least upon an analysis of image content from digital image records. The image content analysis is performed to identify trends that are used to identify user subject interests. The user subject interests can be incorporated into a user profile that is stored in a processor-accessible memory system.

U.S. Patent Publication No. 2009/0297045, incorporated by reference herein in its entirety, teaches a method of evaluating a user subject interest based at least upon an analysis of a user's collection of digital image records and is implemented at least in part by a data processing system. The method receives a defined user subject interest, receives a set of content requirements associated with the defined user-subject-interest, and identifies a set of digital image records from the collection of digital image records each having image characteristics in accord with the content requirements. A subject-interest trait associated with the defined user-subject-interest is evaluated based at least upon an analysis of the set of digital image records or characteristics thereof. The subject-interest trait is associated with the defined user-subject-interest in a processor-accessible memory.

U.S. Patent Publication No. 2007/0177805, incorporated by reference herein in its entirety, describes a method of searching through a collection of images, includes providing a list of individuals of interest and features associated with such individuals; detecting people in the image collection; determining the likelihood for each listed individual of appearing in each image collection in response to the people detected and the features associated with the listed individuals; and selecting in response to the determined likelihoods a number of images such that each individual from the list appears in the selected images. This enables a user to locate images of particular people.

U.S. Pat. No. 6,389,181, incorporated by reference herein in its entirety, discusses photo-collage generation and modification using image processing by obtaining a digital record for each of a plurality of images, assigning each of the digital records a unique identifier and storing the digital records in a database. The digital records are automatically sorted using at least one date type to categorize each of the digital records according at least one predetermined criteria. The sorted digital records are used to compose a photo-collage. The method and system employ data types selected from digital image pixel data; metadata; product order information; processing goal information; or a customer profile to automatically sort data, typically by culling or grouping, to categorize images according to either an event, a person, or chronology.

U.S. Pat. No. 6,671,405, incorporated by reference herein in its entirety, to Savakis, et al., entitled "Method for automatic assessment of emphasis and appeal in consumer images," discloses an approach which computes a metric of "emphasis and appeal" of an image, without user intervention and is included herein in its entirety by reference. A first metric is based upon a number of factors, which can include: image semantic content (e.g. people, faces); objective features (e.g., colorfulness and sharpness); and main subject features (e.g., size of the main subject). A second metric compares the factors relative to other images in a collection. The factors are integrated using a trained reasoning engine. The method described in U.S. Patent Publication No. 2004/0075743 by Chantani et al., entitled "System and method for digital image selection", incorporated by reference herein in its entirety, is somewhat similar and discloses the sorting of images based upon user-selected parameters of semantic content or objective features in the images. U.S. Pat. No. 6,816,847 to Toyama, entitled "Computerized aesthetic judgment of images", incorporated by reference herein in its entirety, discloses an approach to compute the aesthetic quality of images through the use of a trained and automated classifier based on features of the image. Recommendations to improve the aesthetic score based on the same features selected by the classifier can be generated with this method. U.S. Patent Publication No. 2011/0075917, incorporated by reference herein in its entirety, describes estimating aesthetic quality of digital images and is incorporated herein in its entirety by reference. These approaches have the advantage of working from the images themselves, but are computationally intensive.

While these methods are useful for sorting images into event groups, temporally organizing the images, assessing emphasis, appeal, or image quality, or recognizing individuals in an image, they do not address the need for automating the selection of images from a large collection of images to provide a selection of a variety of images that provide interest, aesthetic appeal, and a narrative structure.

There is a need therefore, for an improved automated method for selecting images from a large collection of images to provide a selection of a variety of images that provide interest, aesthetic appeal, and narrative structure in an image-based product.

SUMMARY OF THE INVENTION

A method of making an image-based product comprises storing a plurality of digital images;
providing one or more image distributions, each image distribution corresponding to a theme and including a distribution of image types related to the theme;
selecting a theme having a corresponding image distribution, the image distribution having a distribution of image types;
using a computer to select digital images from the plurality of digital images, the selected digital images having the image distribution corresponding to the selected theme; and
assembling the selected digital images into an image-based product.

Embodiments of the present invention have the advantage of automating the production of image-based products and enhancing the quality of the image-based product through an improved selection of a variety of images that provide a narrative structure, interest, and aesthetic appeal.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with and interchanged with, elements of other described embodiments. Many changes and modifications can be made within the scope of the present invention without departing from the spirit thereof, and the invention includes all such modifications. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features, and advantages of the present invention will become more apparent when taken in conjunction with the following description and drawings wherein identical reference numerals have been used, where possible, to designate identical features that are common to the figures, and wherein:

FIGS. 12A and 12B illustrate 100% stacked column charts of two different distributions of identified persons useful in understanding the present invention.

DETAILED DESCRIPTION OF THE INVENTION

According to the present invention, an image-based product is a printed or electronic product that includes multiple images incorporated into an image-related object (either real or virtual), such as for example a photo-book, photo-album, a photo-card, a picture greeting card, a photo-collage, a picture mug, or other image-bearing item. The image-based product can be printed on a substrate or stored in and retrieved from an electronic storage system. The images can be a user's personal images and the image product can be personalized. The images can be located in specified pre-determined locations within the image-based product or adaptively located according to the sizes, aspect ratios, orientations and other attributes of the images. Likewise, the image sizes, orientations, or aspect ratios included in the image-based product can be adjusted, either to accommodate pre-defined templates with specific pre-determined openings or adaptively adjusted for inclusion in an image-based product.

As intended herein, an image-based product can include printed images, for example images printed on photographic paper, cardboard, writing paper, textiles, ceramics, or rubber such as foam rubber, and polymers. These printed images can be assembled or bound into an image-based product, for example a book. In an alternative embodiment, the image-based product can be an electronic image-based product suitable for display on an electronic display by a computing device and stored as a file, or multiple files, in an electronic storage system such as a computer-controlled disk drive or solid-state memory. Such image-based products can include, for example, photobooks, collages, videos, or slide shows that include one or more images with or without ancillary images such as templates, backgrounds, clip art and the like. In various embodiments, an image-based product includes a single still image, multiple still images, or video images and can include other sensory modalities such as sound. The electronic image-based products are displayed by a computer on a display, for example as a single image or by sequentially displaying multiple pages in the image-based product together with outputting any other related image product information such as sound. Such display can be interactively controlled by a user. Such display devices and image-based products are known in the art as are user interfaces for controlling the viewing of image-based products on a display.

Figure 1:
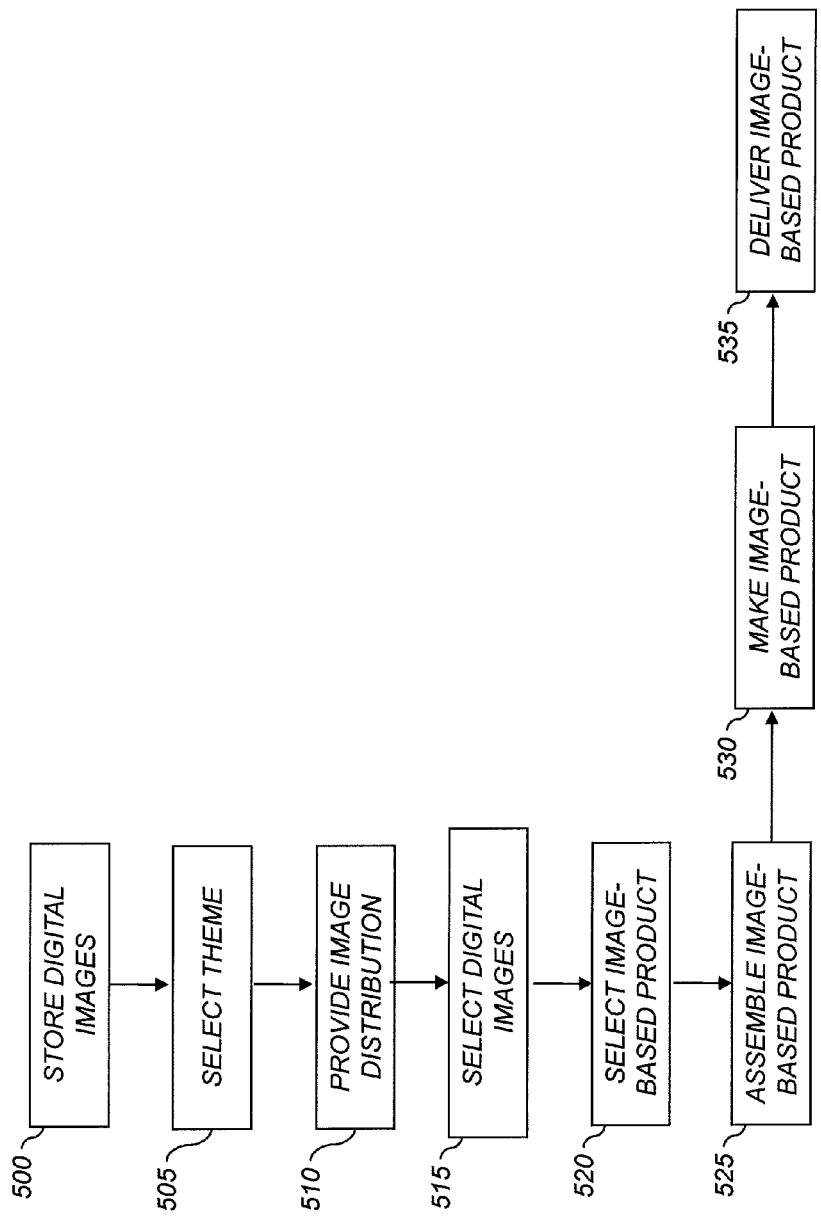
FIG. 1 is a flow diagram according to an embodiment of the present invention.

Referring to FIG. 1, and according to an embodiment of the present invention, a method of making an image-based product includes: storing a plurality of digital images in step 500; selecting a theme having a corresponding image distribution in step 505; providing one or more image distributions in step 510, each image distribution corresponding to the theme and including a distribution of image types related to the theme, the image distribution having a distribution of image types; using a computer to select digital images from the plurality of digital images in step 515, the selected digital images having the image distribution corresponding to the selected theme; and assembling the selected digital images into an image-based product in step 525. In an optional step 520, a user selects an image-based product. Alternatively, an image-based product is selected by the processor, for example based on the theme, or image distribution. The product is made in step 530 and delivered in step 535.

A theme, as used in the present invention, is a narrative structure having a unifying subject. A narrative, for example, can be a story or account of events or experiences and associated, for example, with a person, group, object, or location. A narrative structure has elements corresponding to elements of the narrative. Elements are represented by images in the image-based product. Elements can include actions, characters, objects, locations, or events. A theme is a story line that can be associated with an event.

For example, the theme of an event is a birthday party (a unifying subject) that has a narrative structure including guest arrival, gift presentation, game playing, guest snack, lighting candles on a cake, blowing out candles on a cake, singing, gift opening, and guest departure. A theme can also be a macro-event that includes other events, for example, a history of primary school for a student, including events of each grade. In this example, the unifying subject is the student history and the narrative structure can include, for each grade, a school picture, a casual picture of the student with friends, and an image of a school event in which the student participates.

An image-based product is a product that includes multiple images. The plurality of digital images can form an image collection and can be stored in an electronic storage and retrieval system, for example a processor-controlled rotating magnetic- or optical-media disk or a solid-state memory. The digital images have attributes that are specified as image types. An image distribution is a specification for a set of digital images, each digital image having one or more image types, whose digital images match a statistical distribution of image types. An image type can be an attribute of an image. An image collection from which digital images are selected by a processor can include digital images from a variety of events, capture times, capture locations, either related or unrelated, and can correspond to different themes, either related or unrelated. An image collection can include digital images that correspond to multiple themes. A set of digital images or selected digital images within a set can correspond to multiple related themes.

Selected digital images have image types that correspond to one or more elements of a theme. The image distribution corresponds to a selected theme. For example, an image distribution can include at least one of each element of a narrative structure and can include multiple digital images of a specific element. For example, if the theme is a history of primary school for a student, selected digital images can have one or more image types such as school picture, group photo, activity, person identity, and capture time.

Figure 2:
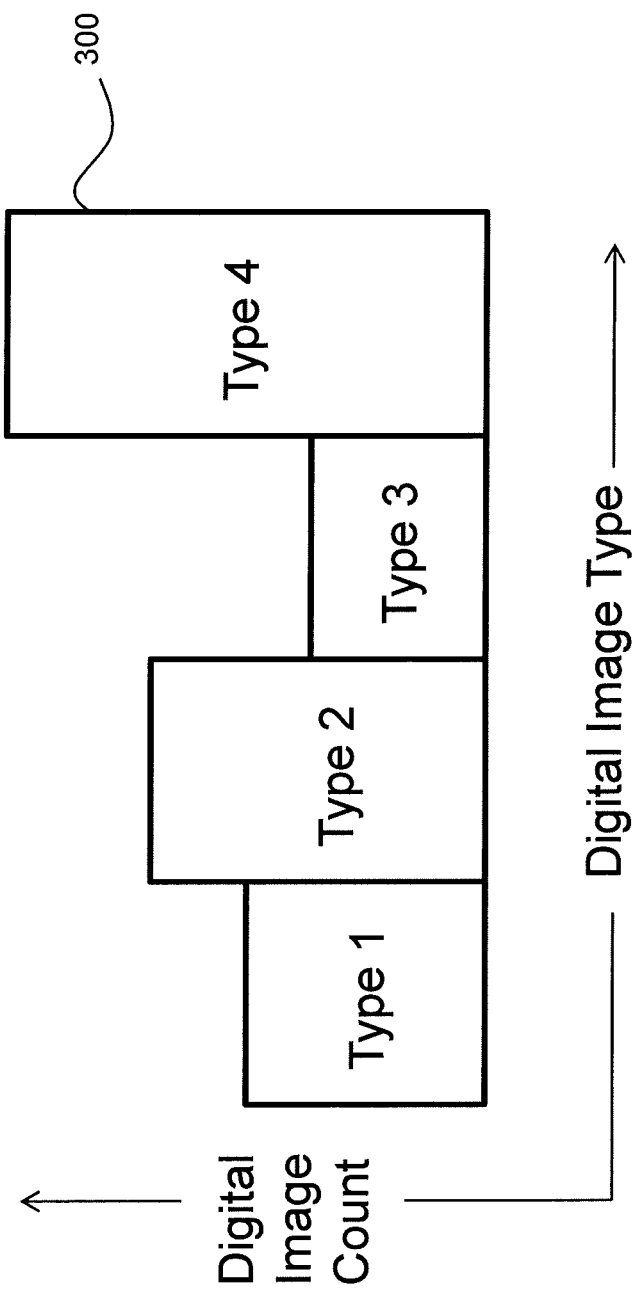
FIG. 2 illustrates a histogram of image types useful in understanding the present invention.

Referring to FIG. 2, a histogram of a digital image collection having a plurality of digital images of four different image types is illustrated. This kind of histogram profile is also referred to herein as an image distribution. An image distribution can be used to describe a collection of digital images in a database (collection) of images or in an image-based product, and it can be used as a filter or template to predefine a distribution of digital images, which is then used to select digital images from an image collection (or database) to be included in an image-based product. The height of each column indicates the image type count 300 of digital images of the image type marked. In this example, the largest plurality of the digital images are of image type four, followed by digital images of image type 2 and then digital images of image type 1. The fewest digital images are of image type 3.

As another example, a digital image collection containing one hundred different digital images classified into four image types of twenty-five digital images each has an image distribution that is equivalent to a collection of four images with one each of the four exclusive image types, because both distributions contain 25% each of four image types. Thus, the one-hundred-image collection can produce twenty-five unique groups of images having the same image distribution as the original collection without any image repeated in any of the groups.

Figure 3:
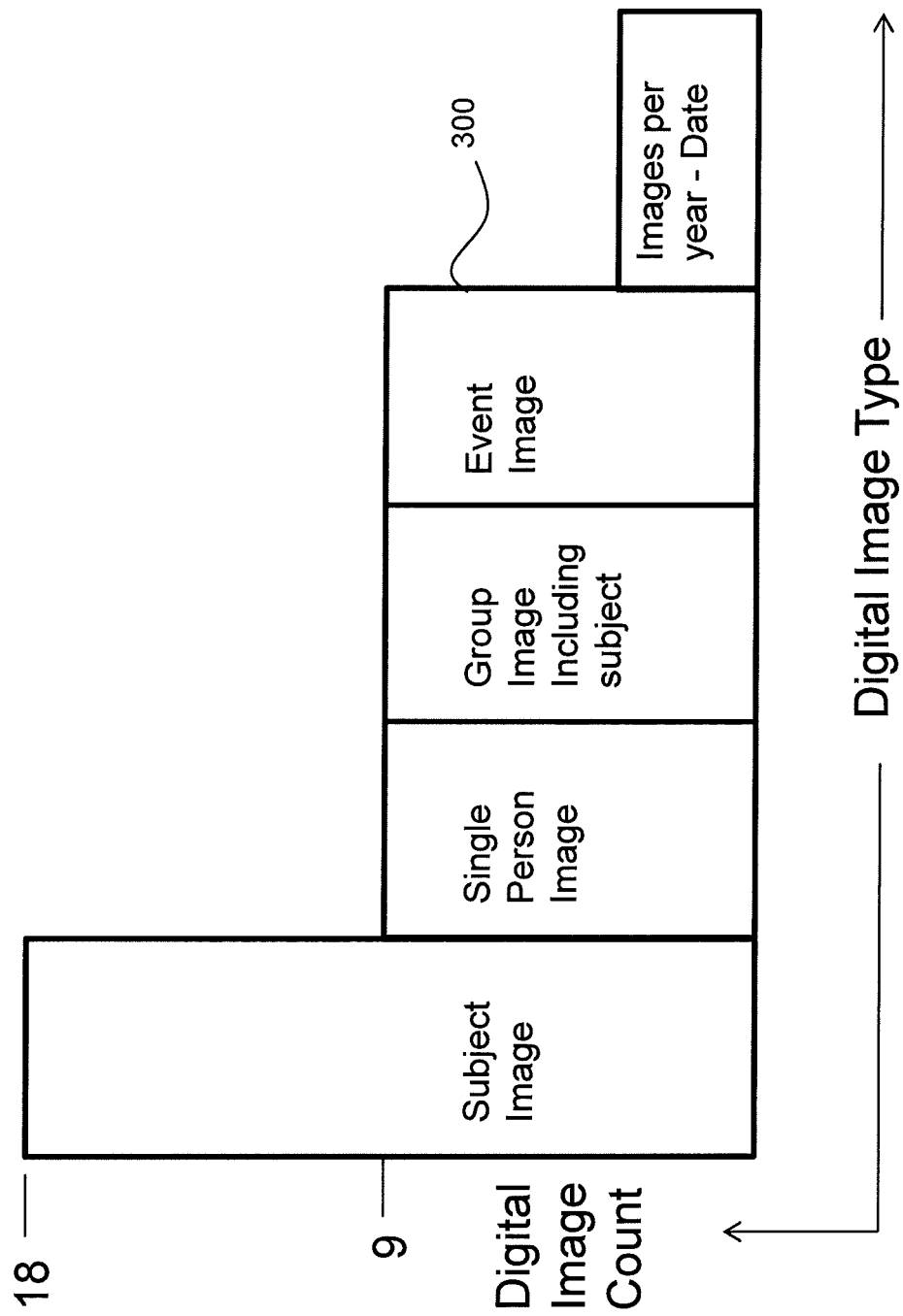
FIG. 3 illustrates a histogram of image types in an example useful in understanding the present invention.

Referring again to the example of a history theme of a student's experiences in a primary school, FIG. 3 illustrates an example of an image distribution having image type counts 300 in a histogram whose corresponding digital images can be selected to narrate the theme. Other image distributions can be employed. In this example, the student has nine years of experience in a primary school for grades kindergarten through eight. Eighteen subject images, nine single person images, nine group images, and nine event images are required in the image distribution, as well as three images per year whose capture date corresponds to the years of historical interest. This image distribution can be satisfied by selecting one image of the subject in a single person image, one image of the subject in a group image, and one image of an event for each of the nine years (three images per year). Note that an image can have multiple types; as illustrated here a subject image has a date image type, a subject image type, and a single or group image type. An image distribution can have optional elements, for example the 18 images of the subject can include at least 18 images or exactly 18 images. If the number is exactly 18, the event images do not include the subject. If the number is at least 18, the event images can, but do not have to, include the subject.

Many other image types can be included, including different subjects. For example, events are categorized by event type (e.g. athletic, musical, theatre, field trip) and an image distribution can require at least a specified percentage or no more than a specified percentage of images having image types corresponding to the event types.

The steps illustrated in FIG. 1 are performed, for example, by a programmable processor executing a software program and connected to a memory storage device, for example an electronic storage system, as described further below. The processor can be a standalone computer, e.g. a desktop computer, a portable computer, or a server computer. Alternatively the processor can be a networked computer capable of communicating with other networked computers and the tasks of the present invention are cooperatively performed by multiple interacting processors. The network is, for example, the internet or a cellular telephone network. In one embodiment, the steps of the present invention are performed with a client—server computer network. Such processors, computer systems, and communication networks are known in the computing industry.

Figure 4:
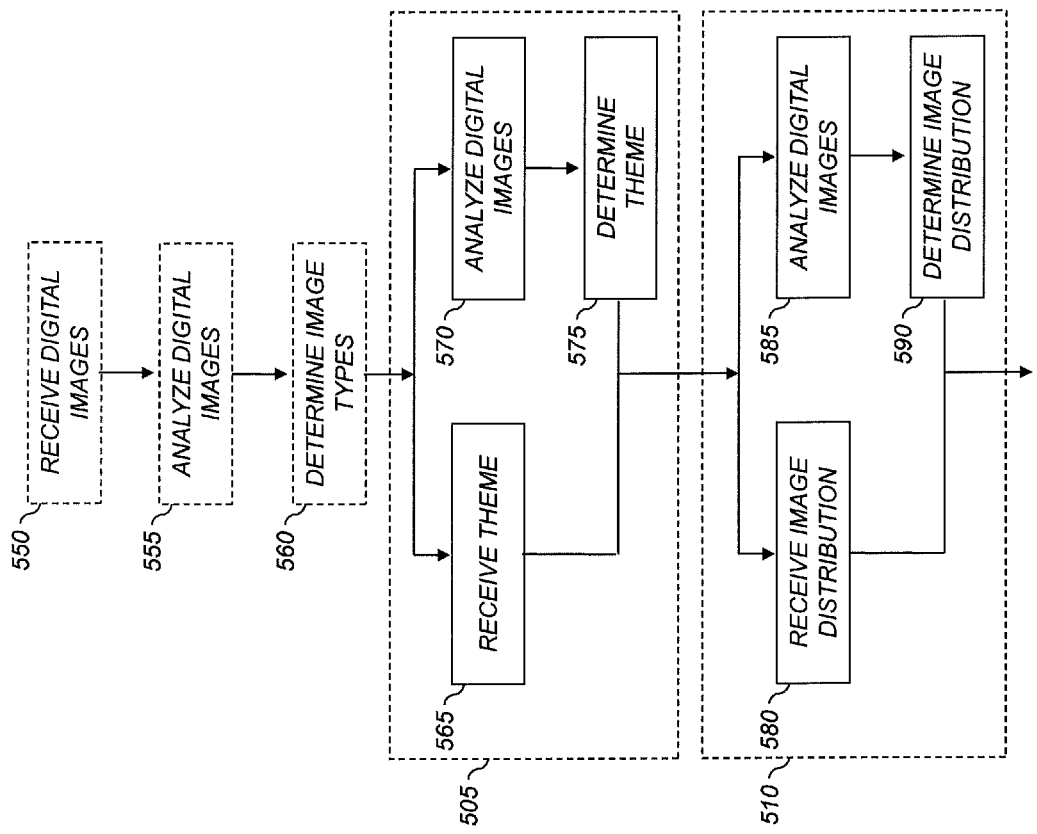
FIG. 4 is a flow diagram according to an alternative embodiment of the present invention.

Referring to FIG. 4, in further embodiments of the present invention, the plurality of digital images is received in step 550, for example, through a network, from an image source, for example a digital camera, remote client computer, or portable computer connected to a cellular telephony or WiFi network. In various embodiments, the plurality of digital images is stored in a permanent non-volatile storage device, such as rotating magnetic media or the plurality of digital images is stored in a volatile memory, for example, random access memory (RAM). Likewise, in an embodiment, the theme and image distributions are received from a remote source. In an embodiment, such a remote source is owned by a user and the processor is owned by a service provider. Alternatively, the theme and image distributions are stored in a memory under the control of the processor.

In one embodiment of the present invention, the image types are provided with the digital images. For example, a user might assign image types to digital images. In another embodiment, the image types are associated with the digital images by processing and analyzing (step 555) the digital images to determine the image type(s) of the digital images (step 560), for example, by analyzing the digital images using software executing mathematical algorithms on an electronic processor. Such mathematics, algorithms, software, and processors are known in the art. Alternatively, the image types are determined manually, for example, by an owner of the digital images interacting with the digital images through a graphic interface on a digital computer and providing metadata to the processing system which is stored therein. The metadata can be stored in a metadata database associated with the digital image collection or with the digital image itself, for example in a file header.

A theme can be selected by receiving a theme selection from a user or the theme selected by an analysis of the plurality of digital images. The present invention is explicitly intended to include both or either method of theme selection. In various embodiments, a theme is selected by receiving it from a user and an image distribution chosen by the processor. Alternatively, an image distribution is selected by receiving it from a user and a theme chosen by the processor.

Thus, as further illustrated in FIG. 4, themes can be selected (step 505), e.g. received from a user or owner of the digital images (step 565) or provided through an analysis of the digital images to determine a theme. In such an embodiment, the method further includes analyzing the plurality of digital images (step 570), to determine themes associated with the plurality of digital images (step 575). Similarly, image distributions can be provided (step 510), e.g. received from a user or owner of the digital images (step 580) or provided through an analysis of the digital images to determine image distributions. In such an embodiment, the method further includes analyzing the plurality of digital images (step 585), to determine image distributions associated with the plurality of digital images (step 590). In various embodiments, image distributions are dependent on the plurality of digital images, themes, or a desired image-based product. The themes or image distributions determined are generated and stored, for example in an electronic storage system controlled by the processor. The determined themes or image distributions can also be communicated to a user or owner of the digital images.

For example, an image collection including an image of a cake with lit candles and "Happy Birthday" written on the cake is deduced to include images of a birthday party and a birthday party theme selected. If an image of a person blowing out the candles is found in the collection, the person is deduced to be the main subject of the party. An image distribution is chosen that includes images that are available in the image collection and that correspond to an image-based product selection. In one embodiment, the relative frequency of image types in the image collection is analyzed to determine an image distribution selection. US Patent Publication 2008/0304808 discloses semantic methods for determining themes and automatically classifying events.

In a further embodiment, the processor can cause the construction of the image-based processor, for example by printing the selected digital images, by sending the selected digital images to a third party for printing, or by making an electronic image-based product such as a slide show, video, photo-book, or collage and storing the electronic image-based product in an electronic storage system. An electronic image-based product is sent to a user electronically or a printed image-based product is sent to a user by physical delivery, e.g. through a postal or package delivery service. Alternatively, the image-based product is delivered to a third party, for example as a gift.

The plurality of digital images can have digital images corresponding to different themes. A large image collection can include images of many different, unrelated events. Different subsets of the digital images in the image collection can correspond to different themes. In other embodiments, a single subset of digital images can have different themes that, for example, can correspond to different perspectives on the information recorded in the subset of digital images. A single theme can have different image distributions corresponding to different ways of communicating the narrative structure inherent in the theme. In other embodiments, different image-based products can correspond to different image distributions, for example in number of images or image types. Image-based products can be limited to particular image distributions or vice versa.

If an image collection does not have the digital images corresponding to an image distribution, an alternative distribution corresponding to the selected theme is selected, and can correspond to a different image-based product.

Image types can explicitly correspond to narrative structural elements of themes. For example, image types can include introduction type, character type, person type, object type, action type, and conclusion type. The digital images can have a temporal association and the image distribution include an image type time order corresponding to a temporal order in the narrative structure. To support this, an image type can be a capture time of the corresponding digital image.

Since many themes are organized around specific individuals or groups of individuals, image distributions can include a specified distribution of image types of specific persons or character types. An image type can include an identified person type and the digital images can be analyzed to recognize and identify persons in an image. The identified person can correspond to an image type.

An image type is a category or classification of image attributes and can be associated with a digital image as image metadata stored with the digital image in a common electronic file or associated with the digital image in a separate electronic file. An image can have more than one image type. For example, a digital image can have an image type such as a portrait orientation type, a landscape orientation type, or a scenic image type. The same digital image can also be classified as an image that includes a person type, a close-up image of a person type, a group image that includes multiple people type, day-time image type, night-time image type, image including one or more animals type, black-and-white image type, color image type, identified person type, identified gender type, and flash-exposed image type. An image type can be an image-usage type classifying the digital image as a popular image and frequently used. Other types can be defined and used as needed for particular image products or as required for desired image distributions. Therefore, a variety of digital images having a desired distribution of image types such as those listed above can be selected.

An image type can include a value that indicates the strength or amount of a particular type for a specific image. For example, an image is a group image but, if it only includes two people, the strength of the group-type is relatively weak compared to a group image that includes 10 people. In this example, an integer value representing a number of persons appearing in the digital image is stored with or in association with the digital image to indicate its group-type strength or value. As an example of ranking group-type digital images, a collection of these images is sorted in descending order according to a magnitude of their group-type value. A selection algorithm for finding images depicting a group can be programmed to preferably select images with a higher group-type value by preferably selecting images from the top of the sorted list.

An image-usage type can have a strength value indicating how often or how much the corresponding digital image is used, for example including a combination of metrics such as how often the image is shared or viewed, whether the image was purchased, edited, used in products, or whether it was deleted from a collection. Alternatively, each of those attributes can be a separate image-type classification. The image-usage type(s) can indicate how much a user values the corresponding digital image. As an example ranking method, the number of times that an image file was opened, or an image shared or viewed is accumulated for each image and then the images ranked in descending order according to the number. A preferential selection scheme can then be implemented whereby the images listed at the top of the ranking are preferentially selected.

An image type can also include a similarity metric that indicates the relative uniqueness of the image. For example, if an image is very different from other images, it can have a high uniqueness image-type value (or an equivalent low similarity value). If an image is similar to one or more of the other images, it can have a low uniqueness image-type value (or an equivalent high similarity value) depending on the degree of similarity and the number of images to which it is similar. Thus, every image can have the same image type but with varying values. The image-type value can also be associated with a digital image as image metadata stored with the digital image in a common electronic file or associated with the digital image in a separate electronic file.

For example, a first desired image distribution specification can include 20% scenic images, 60% scenic images that include a person, and 20% close-up images. The actual number of images of each type is then calculated by multiplying the total number of images in the desired image-based product by the percentage associated with the image type in the desired image distribution. The total number of digital images in the image-based product is determined by the image-based product to be used. A desired image distribution can also include multiple values corresponding to an image type that has multiple values rather than a simple binary classification value.

Figures 5, 6:
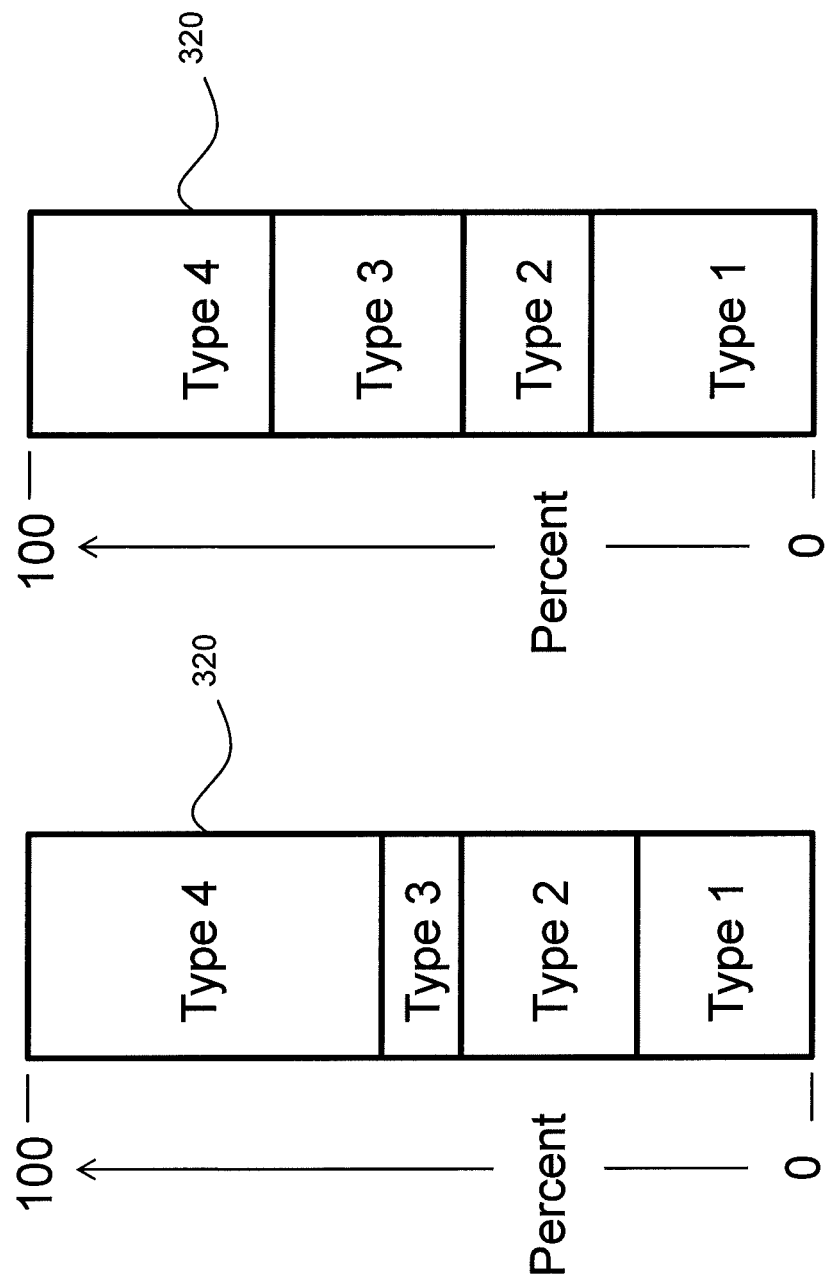
FIG. 5 illustrates a 100% stacked column chart of an image type distribution useful in understanding the present invention.
FIG. 6 illustrates another 100% stacked column chart of an image type distribution useful in understanding the present invention.

Referring to FIGS. 5 and 6, two different desired distributions of image types are illustrated in a 100% stacked column chart in which the total number of image types is 100%. In FIG. 5, the percent image-type desired image distribution 320 of image type 4 is largest, similar to the desired distribution of image types in the collection. However, the prevalence of image type 3 in the desired distribution is relatively smaller than in the collection (FIG. 2) and the prevalence of image types 1 and 2 in the desired distribution are equal. Thus, according to the example of FIG. 5, the desired distribution of image types in an image-based product has relatively fewer digital images of image type 2 and 3 than are in the original collection.

Referring to the example of FIG. 6, the percent image-type desired distribution 320 of image types 2 and 4 are relatively reduced while the percent image-type desired distribution of image types 3 and 1 are increased.

Because a digital image can have multiple image types, a desired distribution need not have a relative frequency of digital images that adds to 100%. For example an image is a landscape image, a scenic image, and a scenic image that includes a person. Similarly, a close-up image is a portrait image and a flash image. Thus, in a second example, a second desired distribution can include 10% scenic images, 40% landscape orientation, 80% day-time image, 100% color image, 60% scenic image that includes a person, and 20% close-up image. In an alternative embodiment, the image types are selectively programmed to be mutually exclusive so that no image is determined to have more than one image type. In this instance the relative distribution percentages should add up to 100%.

Figure 7:
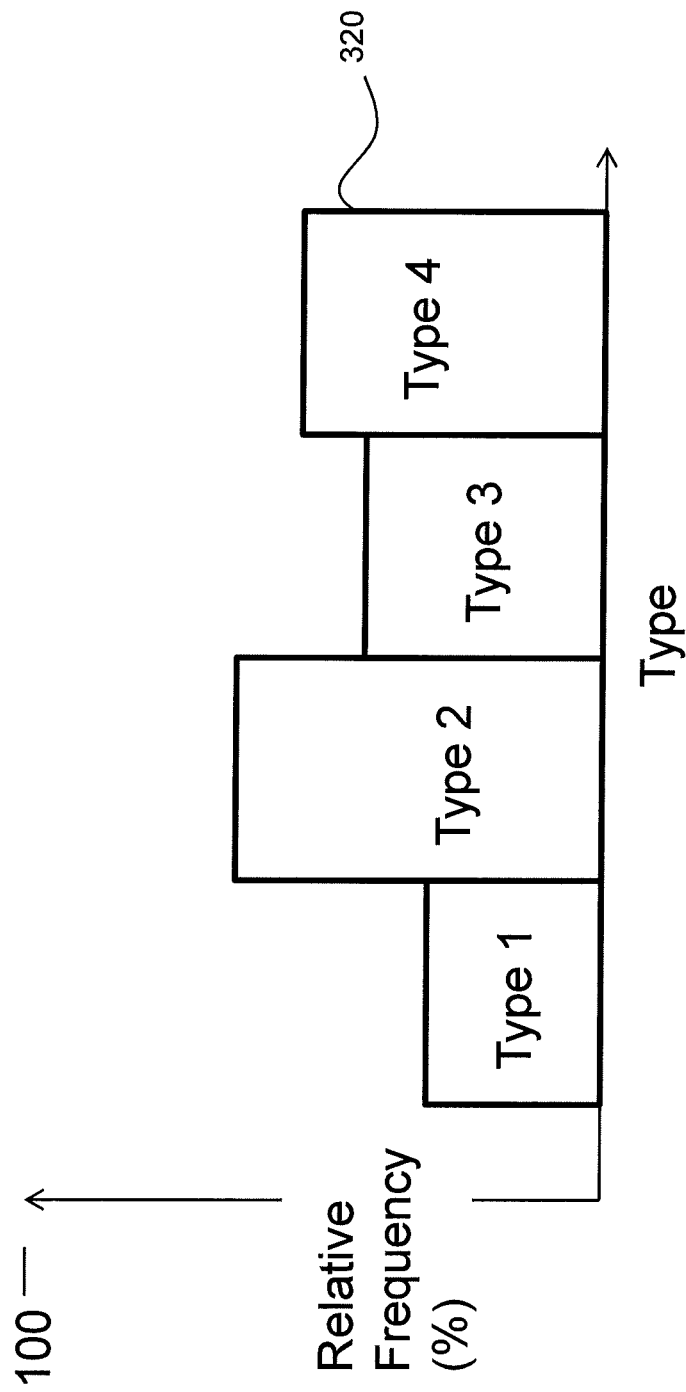
FIG. 7 illustrates a distribution of image types useful in understanding the present invention.

Referring to FIG. 7, a desired distribution of image types 320 is illustrated in which the relative frequency of each distribution of image type 320 is shown by the height of the corresponding column. The relative frequency ranges from 0% (not desired in any selected digital image) to 100% (desired in all selected digital images).

In another embodiment of the present invention, a desired distribution can include more than, but not fewer than, the specified relative frequency of image types. This simplifies the task of selecting digital images when a digital image has more than one image type. For example, if a desired distribution requires a certain relative frequency of close-up images and a different relative frequency of portrait images, a close-up image that is also a portrait image is selected, even if the relative frequency of portrait images in a desired distribution is then exceeded. In various preferred embodiments of the present invention, variation in the relative frequency of images of specified image types is controlled, for example within a range such as from 60% to 80% range or 60% to 100%. Rules can be associated with the image selection (FIG. 1 step 515) to control the image selection process in accordance with the desired distribution, for example specifying a desired degree of flexibility in selecting images that have multiple image types.

According to further embodiments of the present invention, digital images are automatically selected from the plurality of digital images to match the desired distribution, for example by using a processor executing software and an electronic storage storing digital images, theme selections, and image distributions.

According to yet another embodiment of the present invention, different desired distributions of digital images in a common plurality of digital images are specified for multiple image-based products. The same theme is then used for different image-based products for different individuals but with image distributions specifying different individuals. For example, if multiple people take a scenic vacation together, a commemorative photo-album for each person can be created that emphasizes images of different image types preferred by that person specified by different digital image desired distributions and that includes the corresponding subject. Thus, the same collection of digital images can be used to produce multiple image-based products having different image-type desired distributions, for example for different intended recipients of the photo-products.

In another example, a person might enjoy a beach vacation and wish to specify a photo-product such as a photo-album for each of his or her parents, siblings, friends, and others. In each photo-album, a relatively greater number of pictures including the recipient can be provided. Thus, a different selection of digital images is specified by a different desired distribution of digital images.

In one embodiment of the present invention, the various methods of the present invention are performed automatically using, for example, computer systems such as those described further below. Ways for receiving images, photo-product choices, and desired distributions, e.g. using communication circuits and networks, are known, as are ways for manually selecting digital images and specifying photo-products, e.g. by using software executing on a processor or interacting with an on-line computer server.

A method of the present invention can further include the steps of removing bad images from an image collection, for example by analyzing the images to discover duplicate images or dud images. A duplicate image can be an exact copy of an image in the plurality of images, a copy of the image at a different resolution, or a very similar image. A dud image can be a very poor image, for example an image in which the flash failed to fire or was ineffective, an image in which the camera lens of an image-capturing camera was obscured by a finger or other object, an out-of-focus image, or an image taken in error.

In a further embodiment of the present invention, the image quality of the digital images in the plurality of digital images is determined, for example by analyzing the composition, color, and exposure of the digital images, and ranked. A similarity metric can also be employed describing the similarity of each digital image in the plurality of digital images to every other digital image in the plurality of digital images. Quality and similarity measures are known in the art together with software executing on a processor to determine such measures on a collection of digital images and can be employed to assist in the optional duplication and dud detection steps and to aid in the image-selection process. For example, if a desired distribution requires a close-up, portrait image of a person and several such digital images are present in the plurality of digital images, the digital image having the best image quality and the least similarity to other digital images can be chosen. The selected images then specify the photo-product. The similarity and quality values can be associated with a digital image as image metadata stored with the digital image in a common electronic file or associated with the digital image in a separate electronic file. Once the number and types of digital images are selected, the specified image-based product can be laid out and completed, as is known by practitioners in the art, and then caused to be manufactured and delivered to a recipient.

Image types can include images having persons therein or images having specific individuals therein. Face recognition and identification can be performed manually on an image, for example by a user, and the information stored as a corresponding image type. Face recognition and identification can also be done automatically. Using computer methods described in the article "Rapid object detection using a boosted cascade of simple features," by P. Viola and M. Jones, in *Computer Vision and Pattern Recognition*, 2001, *Proceedings of the* 2001 *IEEE Computer Society Conference,* 2001, pp. I-511-I-518 vol. 1; or in "Feature-centric evaluation for efficient cascaded object detection," by H. Schneiderman, in *Computer Vision and Pattern Recognition,* 2004; *Proceedings of the* 2004 *IEEE Computer Society Conference,* 2004, pp. II-29-II-36, Vol. 2., the size and location of each face can be found within each digital image and is useful in determining close-up types of images and images containing people. These two documents are incorporated by reference herein in their entirety. Viola uses a training set of positive face and negative non-face images. The face classification can work using a specified window size. This window is slid across and down all pixels in the image in order to detect faces. The window is enlarged so as to detect larger faces in the image. The process repeats until all faces of all sizes are found in the image. Not only will this process find all faces in the image, it will return the location and size of each face.

Active shape models as described in "Active shape models—their training and application," by Cootes, T. F. Cootes, C. J. Taylor, D. H. Cooper, and J. Graham, *Computer Vision and Image Understanding*, vol. 61, pp. 38-59, 1995, can be used to localize all facial features such as eyes, nose, lips, face outline, and eyebrows. These documents are incorporated by reference herein in their entirety. Using the features that are thus found, one can then determine if eyes/mouth are open, or if the expression is happy, sad, scared, serious, neutral, or if the person has a pleasing smile. Determining pose uses similar extracted features, as described in "*Facial Pose Estimation Using a Symmetrical Feature Model*", by R. W. Ptucha, A. Savakis, *Proceedings of ICME—Workshop on Media Information Analysis for Personal and Social Applications*, 2009, which develops a geometric model that adheres to anthropometric constraints. This document is incorporated by reference herein in its entirety. With pose and expression information stored for each face, preferred embodiments of the present invention can be programmed to classify digital images according to these various detected types (happy, sad, scared, serious, and neutral).

A main subject detection algorithm, such as the one described in U.S. Pat. No. 6,282,317, which is incorporated herein by reference in its entirety, involves segmenting a digital image into a few regions of homogeneous properties such as color and texture. Region segments can be grouped into larger regions based on such similarity measures. Regions are algorithmically evaluated for their saliency using two independent yet complementary types of saliency features—structural saliency features and semantic saliency features. The structural saliency features are determined by measureable characteristics such as location, size, shape and symmetry of each region in an image. The semantic saliency features are based upon previous knowledge of known objects/regions in an image which are likely to be part of foreground (for example, statues, buildings, people) or background (for example, sky, and grass), using color, brightness, and texture measurements. For example, identifying key features such as flesh, face, sky, grass, and other green vegetation by algorithmic processing are well characterized in the literature.

In one embodiment, once the image types are determined for each of the digital images in the plurality of digital images, the relative frequency of digital images of each image type can optionally be determined. For example, if a collection of 60 digital images is provided and 30 are determined by the processing system to be scenic, then the relative frequency data stored in association with the collection is a value representing 50%. This information is useful when selecting the digital images from the collection to satisfy a specified image-based product.

The relative frequency of image types in an image collection can also be optionally used by selecting the image-based product to have a desired distribution dependent on the relative frequency of image types in an image collection, since a given image-based product (e.g. a user-selected photo-product) can require a certain number of image types of digital images in a collection. The desired distribution can have an equivalent image-type distribution to the image-type distribution of the image collection, for example without repeating any digital images. Therefore, an image-based product can be selected, suggested to a user, or modified depending on the relative frequency or number of digital images of each image type in a digital image collection.

Similarly, the relative frequency of image types can also be optionally used to select the image-type distribution, since an image distribution can require a certain relative frequency or number of image types of digital images in a collection. If, for example, an image-based product requires a certain number of images and a first image-type distribution cannot be satisfied with a given image collection, an alternative second image-type distribution is selected. A variety of ways to specify an alternative second image-type distribution can be employed. For example, a second image-type distribution, including the same image types but requiring fewer of each image type, is selected. Alternatively, a second image-type distribution including image types related to the image types required by the first distribution (e.g. a group image with a different number of people) is selected. Therefore, a distribution can be selected depending on the relative frequency or number of digital images of each image type in a collection.

An image-based product having an image distribution (and a theme and intended audience) can thus be suggested to a user, depending on the relative frequency or number of image types in a digital image collection. Therefore, according to a method of the present invention, a different desired distribution is specified, received, or provided for each of a variety of different audiences or recipients. An image collection can be analyzed and the analysis used to select a theme suggested to a user.

An image type of digital image can be an image with an identified person. For example, an image type is a digital image including a specific person, for example the digital image photographer, a colleague, a friend, or a relative of the digital image photographer as identified by image metadata. Thus a distribution of digital images in a collection can include a distribution of specified individuals and a variety of the digital images that include a desired distribution of persons can be selected. For example, a variety of the digital images can include a desired distribution of close-up, individual, or group images including a desired person.

Thus, an embodiment of the present invention includes analyzing the digital images to determine the identity of persons found in the digital images, forming one or more desired distributions of digital images depending on each of the person identities, selecting a variety of the digital images each satisfying the desired distribution, and specifying a photo-product that includes each of the selected varieties of digital images.

Figure 11:
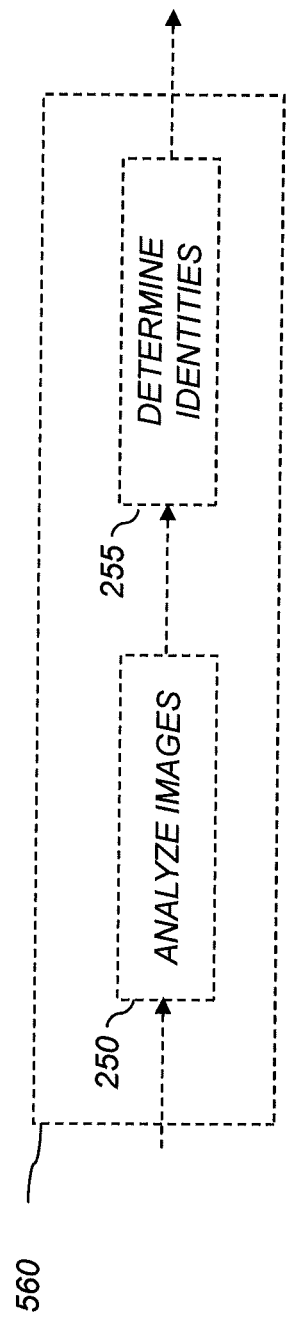
FIG. 11 illustrates a flow diagram according to another embodiment of the present invention.

Referring to FIG. 11, automatically determining image types in step 560 can include analyzing a digital image (step 250) to determine the identity of any persons in the digital image (step 255). Algorithms and software executing on processors for locating and identifying individuals in a digital image are known. Thus, an image-based product can be selected that includes a desired distribution of images of specific people. For example, at a family reunion, it might be desired to specify a distribution of image types that includes a digital image of at least one of every member of the family. If 100 digital images are taken, then the distribution can include 1% of the image types for each member. If 20 family members are at the reunion, this distribution then requires that 20% of the pictures are allocated to digital images of members (excluding group images). Depending on rules that are associated with the image selection process, a balance can be maintained between numbers of digital images of each family member in the specified photo-product. Likewise, the number of individual or group images can be controlled to provide a desired outcome. If the desired distribution cannot be achieved with the provided plurality of digital images, the determination of the relative frequency of image types can demonstrate the problem and an alternative image-based product or distribution selected or suggested. Since automated face finding and recognition software is available in the art, in an embodiment of the present invention, one can simply require that an image-based product include at least one image of each individual in a digital image collection, thus indirectly specifying a distribution. Such an indirect distribution specification is included as a specified distribution in an embodiment of the present invention.

Referring to FIGS. 12A and 12B, desired relative frequencies of individual image types 320 for two different distributions are illustrated. In FIG. 12A, persons A and B are desired to be equally represented in the distribution of selected digital images, while person C is desired to be represented less often. In FIG. 12B, person B is desired to be represented in the selected digital images more frequently than person A, and person C is not represented at all.

Since images frequently include more than one individual, it can be desirable, as discussed above to include a selection rule that makes the desired distribution a minimum, or that controls the number of group images versus individual images. Thus, a person can be included in a minimum number of selected images, selected individual images, or selected group images.

Users can specify image-type distributions using a computer, for example a desktop computer known in the prior art. A processor can be used to provide a user interface, the user interface including controls for setting the relative frequencies of digital images of each image type. Likewise, a preferred method of the present invention can include using a processor to receive a distribution of image types that includes a range of relative frequencies of image types.

In any of these embodiments, the digital image can be a still image, a graphical element, or a video image sequence, and can include an audio element. The digital images can be multi-media elements.

Users can interact with a remote server with a client computer through a computer network, such as the interne. The user can send the plurality of image to the remote server, where it is stored. The user can also provide an image-based product selection, a theme selection, and image distribution selection, as desired. Images based on the selected theme and image distribution are selected and an image-based product is assembled from the selected images. The image-based product can be printed and delivered or made into an electronic product and delivered electronically, for example by email, and viewed on a display screen by a user or other recipient.

In one embodiment of the present invention, a computer system for making an image-based product includes a computer server connected to a communication network for receiving communication from a remote client computer; and a computer program. The computer program causes the computer server to store a plurality of digital images; provide one or more image distributions, each image distribution corresponding to a theme and including a distribution of image types related to the theme; select a theme having a corresponding image distribution, the image distribution having a distribution of image types; use a computer to select digital images from the plurality of digital images, the selected digital image having the image distribution corresponding to the selected theme; and assemble the images in the selected group of images into an image-based product.

Various embodiments of the present invention can be implemented using a variety of computers and computer systems illustrated in FIGS. 8, 9 and 10 and discussed further below. In one preferred embodiment, for example, a desktop or laptop computer executing a software application can provide a multi-media display apparatus suitable for specifying distributions, providing digital image collections, or photo-product choices, or for receiving such. In a preferred embodiment, a multi-media display apparatus includes: a display having a graphic user interface (GUI) including a user-interactive GUI pointing device; a plurality of multi-media elements displayed on the GUI, and user interface devices for providing a way for a user to enter information into the system. A desktop computer, for example, can provide such an apparatus.

In another preferred embodiment, a computer server can provide web pages that are served over a network to a remote client computer. The web pages can permit a user of the remote client computer to provide digital images, photo-product, and distribution choices. Applications provided by the web server to a remote client can enable presentation of selected multi-media elements, either as stand-alone software tools or provided through html, Java, or other known internet interactive tools. In this preferred embodiment, a multi-media display system includes: a server computer providing graphical user interface display elements and functions to a remote client computer connected to the server computer through a computer network such as the internet, the remote client computer including a display having a graphic user interface (GUI) including a user-interactive GUI pointing device; and a plurality of multi-media elements stored on the server computer, communicated to the remote client computer, and displayed on the GUI.

Computers and computer systems are stored program machines that execute software programs to implement desired functions. According to a preferred embodiment of the present invention, a software program executing on a computer with a display and graphic user interface (GUI) including a user-interactive GUI pointing device includes software for displaying a plurality of multi-media elements having images on the GUI and for performing the steps of the various methods described above.

Figure 8:
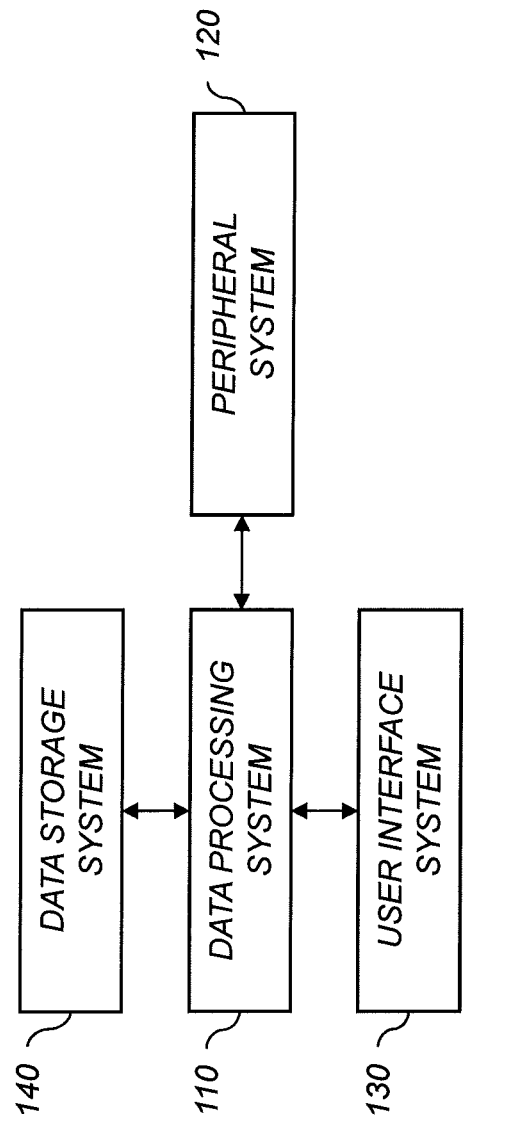
FIG. 8 is a simplified schematic of a computer system useful for the present invention.

FIG. 8 is a high-level diagram showing the components of a system useful for various embodiments of the present invention. The system includes a data processing system 110, a peripheral system 120, a user interface system 130, and a data storage system 140. The peripheral system 120, the user interface system 130 and the data storage system 140 are communicatively connected to the data processing system 110. The system can be interconnected to other data processing or storage system through a network, for example the internet.

The data processing system 110 includes one or more data processing devices that implement the processes of the various preferred embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various preferred embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 8.

Figure 10:
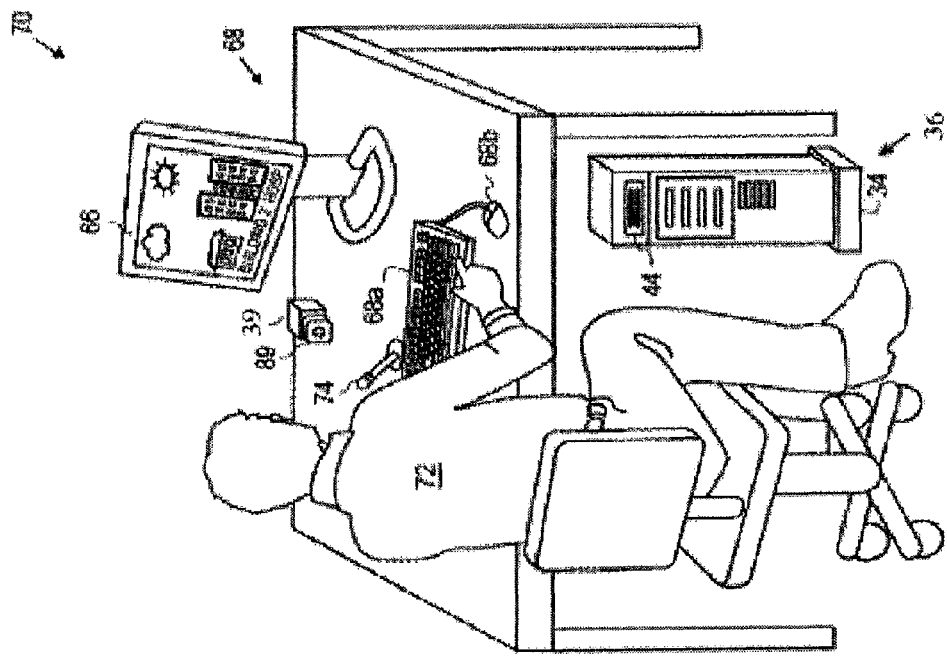
FIG. 10 is a schematic of another computer system useful for embodiments of the present invention.
Figure 9:
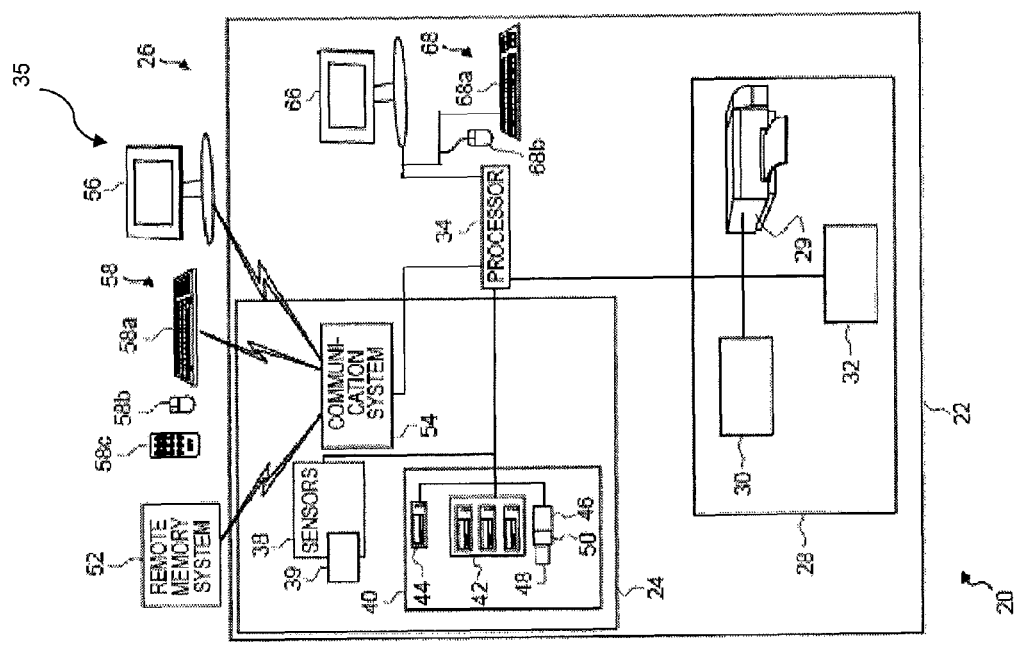
FIG. 9 is a schematic of a computer system useful for embodiments of the present invention.

Referring to FIGS. 9 and 10, computers, computer servers, and a communication system are illustrated together with various elements and components that are useful in accordance with various preferred embodiments of the present invention. FIG. 9 illustrates a preferred embodiment of an electronic system 20 that can be used in generating an image product. In the preferred embodiment of FIG. 9, electronic system 20 includes a housing 22 and a source of content data files 24, a user input system 26 and an output system 28 connected to a processor 34. The source of content data files 24, user-input system 26 or output system 28 and processor 34 can be located within housing 22 as illustrated. In other preferred embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files can include, for example and without limitation, still images, image sequences, video graphics, and computer-generated images. Source of content data files 24 can optionally capture images to create content data for use in content data files by use of capture devices located at, or connected to, electronic system 20 or can obtain content data files that have been prepared by or using other devices. In the preferred embodiment of FIG. 9, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the preferred embodiment of FIG. 9, system 20 is shown having a hard drive 42, a disk drive 44 for a removable disk such as an optical, magnetic or other disk memory (not shown) and a memory card slot 46 that holds a removable memory 48 such as, a removable memory card, and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the preferred embodiment shown in FIG. 9, system 20 has a communication system 54 that in this preferred embodiment can be used to communicate with an optional remote memory system 52, an optional remote display 56, or optional remote input 58. The optional remote memory system 52, optional remote display 56, optional remote input 58A can all be part of a remote system 35 having an input station 58 having remote input controls 58 (also referred to herein as "remote input 58"), can include a remote display 56, and that can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network, such as a wired or wireless local area network or any other conventional wired or wireless data transfer system. In one useful preferred embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This permits such a user to make a designation of content data files to be used in generating an image-enhanced output product and to select an output form for the output product. User input system 26 can also be used for a variety of other purposes including, but not limited to, permitting a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can include any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the preferred embodiment shown in FIG. 9, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 9. Similarly, local input 68 can take a variety of forms. In the preferred embodiment of FIG. 9, local display 66 and local user input 68 are shown directly connected to processor 34.

As is illustrated in FIG. 10, local user input 68 can take the form of a home computer having a processor 34 and disc storage 44, an editing studio, or kiosk 70 (hereafter also referred to as an "editing area 70") that can also be a remote system 35 or system 20. In this illustration, a user 72 is seated before a console including a local keyboard 68a and mouse 68b and a local display 66 which is capable, for example, of displaying multimedia content. As is also illustrated in FIG. 10, editing area 70 can also have sensors 38 including, but not limited to, video sensors 39, audio sensors 74 and other sensors such as multispectral sensors that can monitor user 72 during a production session.

Referring back to FIG. 9, output system 28 is used for rendering images, text or other graphical representations in a manner that permits image-product designs to be combined with user items and converted into an image product. In this regard, output system 28 can include any conventional structure, system, or output device 32 that is known for printing or recording images, including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as a type of printer that generates color images. However, it will be appreciated that the claimed methods and apparatus herein can be practiced with a printer 29 that prints monotone images such as black and white, grayscale, or sepia toned images. As will be readily understood by those skilled in the art, a system 35, 20 with which a user interacts to define a user-personalized image product can be separated from a remote system (e.g. 35, 20) connected to a printer, so that the specification of the image product is remote from its production.

In certain embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components. The system 20 of FIGS. 9 and 10 can be employed to make and display an image product according to a preferred embodiment of the present invention.

The invention has been described in detail with particular reference to certain preferred embodiments thereof, but it will be understood that variations and modifications can be effected within the spirit and scope of the invention.

PARTS LIST 9, 18 Number of Images
20 system
22 housing
24 source of content data files
26 user input system
27 graphic user interface
28 output system
29 printer
30 tangible surface
34 processor
35 remote system
38 sensors
39 video sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 home computer, editing studio, or kiosk ("editing area")
72 user
74 audio sensors
110 data processing system 120 peripheral system
130 user interface system
140 data storage system
250 analyze images step
255 determine identities step
300 type count
320 image type distribution
500 store digital images step
505 select theme step
510 provide image distribution step
515 select digital images step
520 select image-based product step
525 assemble image-based product step
530 make image-based product step
535 deliver image-based product step
550 receive digital images step
555 analyze digital images step
560 determine image types step
565 receive theme step
570 analyze digital images step
575 determine theme step
580 receive image distribution step
585 analyze digital images step
590 determine image distribution step

The invention claimed is:

1. A method of generating an image-based product, the method comprising:
selecting, by a computing device, a theme having a corresponding image distribution, wherein the image distribution comprises a pre-defined distribution of image types for elements of a narrative structure associated with the theme;
analyzing, by the computing device, a relative frequency of image types in an image collection comprising a plurality of availability digital images;
modifying, by the computing device, the pre-defined distribution of image types based at least on the relative frequency of image types in the image collection;
selecting, by the computing device, digital images from the plurality of available digital images that correspond to the image types for the elements of the narrative structure associated with the theme based at least on the modified pre-defined distribution of image types; and
assembling, by the computing device, the selected digital images into an image-based product.

2. The method of claim 1, further comprising causing the construction of the image-based product.

3. The method of claim 1, wherein the image-based product comprises an electronic image-based product or a printed image-based product.

4. The method of claim 1, further comprising analyzing the plurality of available digital images to determine one or more themes.

5. The method of claim 1, further comprising receiving one or more image distributions.

6. The method of claim 1, further comprising providing one or more image distributions associated with an image-based product.

7. The method of claim 6, further comprising selecting one of the one or more image distributions based at least on the relative frequency of image types in the image collection.

8. The method of claim 1, further comprising providing a plurality of image distributions associated with one theme.

9. The method of claim 1, further comprising making an image distribution based on the selected theme.

10. The method of claim 1, further comprising selecting an alternative image distribution when an image distribution does not correspond with the plurality of available digital images.

11. The method of claim 1, wherein the image types include one or more of the types: introduction type, character type, person type, object type, action type, and conclusion type.

12. The method of claim 1, wherein the digital images have a temporal association, and wherein the image distribution includes an image type time order.

13. The method of claim 1, wherein the image distribution includes a specified distribution of person or character image types.

14. The method of claim 1, wherein an image type includes an identified person type.

15. The method of claim 1, wherein the image product is a photo-book or a photo-collage.

16. The method of claim 1, further comprising analyzing the plurality of available digital images to identify themes associated with the plurality of digital images.

17. The method of claim 1, further comprising generating and storing one or more image distributions based on the themes identified.

18. The method of claim 1, further comprising receiving one or more image distributions or one or more themes associated with the image collection.

19. The method of claim 1, further comprising storing the plurality of available digital images.

20. The method of claim 1, further comprising:
determining a relative uniqueness of an image in the image collection;
modifying the pre-defined distribution of image types based at least on the relative uniqueness of the image.

21. A non-transitory computer-readable medium having instructions stored thereon that, upon execution, cause a computer device to perform operations comprising:
select a theme having a corresponding image distribution, wherein the image distribution comprises a pre-defined distribution of image types for elements of a narrative structure associated with the theme;
analyze a relative frequency of image types in an image collection comprising a plurality of a availability digital images;
modify the pre-defined distribution of image types based at least on the relative frequency of image types in the image collection;
select digital images from the plurality of available digital images that correspond to the image types for the elements of the narrative structure associated with the theme based at least on the modified pre-defined distribution of image types; and
assemble the selected digital images into an image-based product.

22. The non-transitory computer readable medium of claim 21, the operations further comprising storing the plurality of available digital images.

23. A system comprising:
one or more processors configured to:
select a theme having a corresponding image distribution, wherein the image distribution comprises a pre-defined distribution of image types for elements of a narrative structure associated with the theme;
analyze a relative frequency of image types in an image collection comprising a plurality of availability digital images;

modify the pre-defined distribution of image types based at least on the relative frequency of image types in the image collection;

select digital images from a plurality of available digital images that correspond to the image types for the elements of the narrative structure associated with the theme based at least on the modified pre-defined distribution of image types; and assemble the selected digital images into an image-based product.

24. The system of claim 23, wherein the one or more processors are further configured to analyze the plurality of available digital images to determine one or more themes.

* * * * *